UNITED STATES PATENT OFFICE.

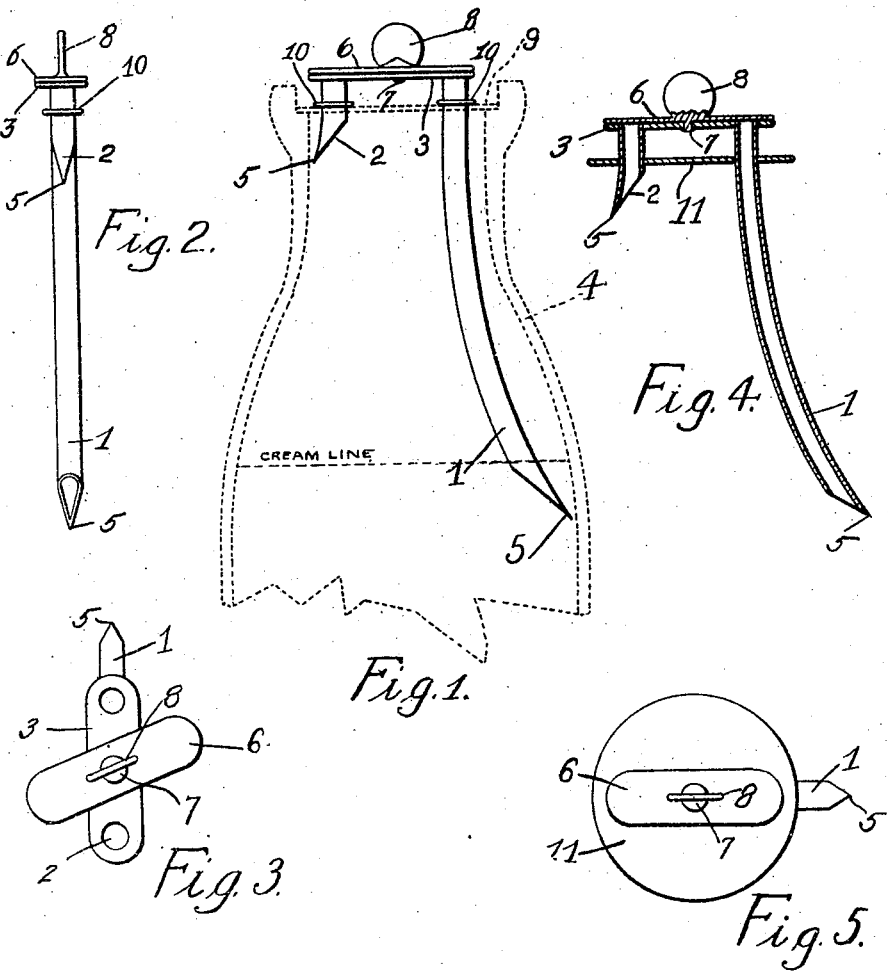

RAYMOND V. DAVIS, OF DENVER, COLORADO.

COMBINED CREAM-SEPARATOR AND BOTTLE-STOPPER.

1,279,667.  Specification of Letters Patent.  Patented Sept. 24, 1918.

Application filed May 21, 1917. Serial No. 169,991.

*To all whom it may concern:*

Be it known that I, RAYMOND V. DAVIS, a citizen of the United States, residing at 2254 High street, in the city and county of Denver and State of Colorado, have invented certain new and useful Improvements in Combined Cream-Separators and Bottle-Stoppers, of which the following is a specification.

This invention relates more particularly to a combined milk separator and bottle stopper of the detachable type and it has for its primary aim to provide a device of the character described having a long pouring or liquid conducting tube and a shorter venting or air admitting tube, both tubes being sharpened to facilitate the puncturing of the usual cardboard disk stopper of a milk bottle.

The invention further resides in the features of construction, and the arrangements and combinations of parts hereinafter described in detail and claimed in a succinct manner, reference being had to the accompanying drawing wherein—

Figure 1 is a side elevation of my improved device showing how it is applied to a milk bottle, the latter being shown in dotted lines;

Fig. 2 is an edge view of the combined milk separator and bottle stopper;

Fig. 3 is a top plan view thereof with the stopper opened;

Fig. 4 is a vertical section of a slightly modified form of the invention, and

Fig. 5 is a top plan view of the construction shown in Fig. 4.

Referring more in detail to the drawing, and employing like characters of reference for corresponding parts throughout the several views, the numeral 1 designates the longer tube and 2 the shorter tube, said tubes opening at their upper ends through a cross connecting bar 3 to which they are rigidly fixed. The longer tube is curved outwardly to conform substantially to the contour of the bottle 4 whereby the lower end of said tube will practically engage the inner wall of the enlarged body portion of the bottle to permit of a thorough draining of the contents. The shorter tube is preferably disposed so as to be on the upper side of the bottle when tilted and admit air to replace the liquid that is drawn through the liquid conducting tube 1. Both tubes have their lower ends beveled to provide the piercing points 5, said bevels being divergently related so that the piercing points will be on the opposite outer sides of said tubes.

A stopper is provided for the opened upper ends of the tubes and comprises an elongated closure plate 6 that is pivoted between its ends to the cross-bar 3 and between the tubes, as at 7, whereby upon rotating said closure plate the same may be disposed over the tubes to close the same or may be swung to a position as shown in Fig. 3 to unobstruct the tube passages. A handle or knob 8 is formed on the closure plate to facilitate the manipulation thereof.

In practice, to withdraw the contents of the bottle 4, the tube 1 is entered through the disk stopper 9 and subsequently the tube 2 is also entered as shown in Fig. 1. The closure plate may then be moved to uncover the tubes and the contents withdrawn in an obvious manner. The length of tube 1 is such that it extends below the cream and into the milk so that in tilting the bottle the heavier liquid will first be removed and separated from the cream. Each tube may be provided with an annular shoulder 10 to abut the disk 9 and thereby limit the inward movement of the tubes.

In some instances it is desirable to have a metal disk stopper with the device so that the usual cardboard disk may be dispensed with and replaced by the modified form of the invention depicted in Figs. 4 and 5, said modification consisting of the metal disk 11 that is fixedly secured to the tubes below the connecting cross-bar 3. This arrangement provides a strong and reinforced construction of simple design which may be economically manufactured and will be of practical use.

The foregoing detail description has been given for clearness of understanding only, it being understood that various changes in the construction may be resorted to as fall within the scope of the appended claims, and that the materials used for the several parts may be such as the manufacturer desires.

What is claimed is:—

1. A combined cream separator and bottle stopper comprising a disk-like stopper part, a pair of tubes piercing the stopper and fixedly secured thereto, one tube terminating immediately beneath the stopper and the other tube extending down a considerable distance, both tubes extending above the stopper, a bar-like member through which the tubes open, rigidly connecting the latter at their upper ends and supported thereby spaced above the stopper whereby to provide a rigid structure above the disk stopper adaptable as a handle, and a bar-like closure for the tubes.

2. A combined cream separator and bottle stopper comprising a stopper part, a pair of tubes piercing the stopper and fixedly secured thereto, both tubes extending above the stopper an equal distance, a member through which the tubes open, rigidly connecting the latter at their upper ends in spaced relation to the stopper and constituting a rigid handle therefor, and a closure for the tubes arranged pivotally on top of said connecting member.

In testimony whereof I affix my signature

RAYMOND V. DAVIS.